United States Patent
Isaacson

[11] Patent Number: 6,099,077
[45] Date of Patent: Aug. 8, 2000

[54] HEAD RESTRAINT ASSEMBLY FOR MOTOR VEHICLE

[75] Inventor: Troy Allen Isaacson, Plymouth, Mich.

[73] Assignee: Centura Group, Inc., Novi, Mich.

[21] Appl. No.: 09/179,642

[22] Filed: Oct. 27, 1998

[51] Int. Cl.[7] ............................... A47C 7/38; A47C 1/10
[52] U.S. Cl. ............................................................ 297/410
[58] Field of Search ............................ 297/410; 403/326, 403/329

[56] References Cited

U.S. PATENT DOCUMENTS

| | | | |
|---|---|---|---|
| 3,062,157 | 11/1962 | Woods | 403/329 X |
| 3,563,603 | 2/1971 | D'Aprile . | |
| 3,635,527 | 1/1972 | Weber | 297/410 |
| 3,639,041 | 2/1972 | Furukawa | 297/410 X |
| 4,489,979 | 12/1984 | Zyngier . | |
| 4,577,904 | 3/1986 | Wiese et al. . | |
| 4,650,250 | 3/1987 | Krugener et al. | 297/410 |
| 4,657,297 | 4/1987 | Ishibashi | 297/410 X |
| 4,854,642 | 8/1989 | Vidwans et al. . | |
| 4,976,493 | 12/1990 | Frankila . | |
| 5,590,929 | 1/1997 | Hamelin . | |
| 5,667,276 | 9/1997 | Connelly et al. . | |
| 5,945,952 | 8/1999 | Davidson | 403/329 X |

FOREIGN PATENT DOCUMENTS

| | | | |
|---|---|---|---|
| 167192 | 3/1956 | Australia | 403/326 |
| 2458422 | 2/1981 | France | 297/410 |
| 242728 | 12/1975 | Germany | 297/410 |
| 2200282 | 2/1979 | Germany | 297/410 |
| 406262968 | 9/1994 | Japan | 297/410 |
| 1133135 | 1/1985 | U.S.S.R. | 297/410 |
| 2064312 | 6/1981 | United Kingdom | 297/410 |
| 2069584 | 8/1981 | United Kingdom | 297/410 |

*Primary Examiner*—Peter M. Cuomo
*Assistant Examiner*—David E. Allred
*Attorney, Agent, or Firm*—Brooks & Kushman P.C.

[57] ABSTRACT

An improved head restraint assembly 16 for motor vehicle seats 10 for enabling a head restraint pad 18 to be moved with respect to a motor vehicle seat 10. The assembly 16 includes a removable tubular bushing 22 mounted to the seat back 14 and having an inside bore 24 for receiving a head restraint pad post 20. The bushing 22 further provides a head 26 outside the seat 10 having a socket 32 adapted to receive a button sub-assembly 38 which enables the head restraint pad 18 to be adjusted to various heights. The button sub-assembly 38 includes a spring 40 having a detent portion 48, and an actuator portion 42 movable with respect to the head 26. The detent 48 is biased into alignment with a retainer notch 52 formed on the post 20 and is movable out of alignment with the post 20 by moving the actuator portion 42, thereby allowing the post 20 to move longitudinally within the bore 24.

9 Claims, 2 Drawing Sheets

HEAD RESTRAINT ASSEMBLY FOR MOTOR VEHICLE

TECHNICAL FIELD

The present invention relates to a head restraint assembly for motor vehicle seats for enabling a head restraint pad to be moved with respect to a motor vehicle seat.

BACKGROUND ART

Motor vehicle seats typically include a head restraint pad mounted to the seat for comfort and safety of the passenger. The head restraint pad is mounted on one or two posts which are inserted into guide sleeves affixed to the seat. The posts typically include retainer notches which allow the head restraint pad to be vertically adjustable.

U.S. Pat. No. 4,854,642 to Hoover Universal, Inc., discloses a head restraint guide assembly having a bushing member installed within the seat back for receiving the head restraint pad posts. The head restraint bushing includes extending legs with ramp surfaces so that when the bushing is inserted within the seat back the legs are resiliently deflected and become locked into place when the installed position is reached. The head restraint post passes through the bushing and has a number of notches which provide detents. A detent lug carried by the bushing engages the detent notches and is resiliently biased against the post. The detent notches are provided with cam surfaces enabling the head restraint to be raised and lowered to and past the detent positions. The lowermost notch forms a retainer notch with a radial wall which prevents complete removal of the head restraint. A leaf spring actuator is used which can be depressed from outside of seat back and acts on the detent lug to deflect it out of engagement with the detent notches, thereby enabling withdrawal of the head restraint assembly.

In order to remove the head restraint post, a downward force must be applied to the actuator by a tool such as a screwdriver, causing the lug to move out of engagement with the retainer notch. Additionally, once the bushing member is inserted into the seat, it is not removable.

SUMMARY OF INVENTION

According to the present invention, an improved head restraint assembly is provided for enabling a head restraint pad to be moved with respect to a motor vehicle seat. The head restraint pad includes at least one post connected to and supporting the head restraint pad, and having at least one retainer notch for vertically adjusting the height of the head restraint pad.

The assembly is comprised of at least one tubular bushing mounted to the vehicle seat having an inside bore for receiving the post. A head is formed on the bushing outside the seat and is provided with a socket exposed at one portion to the bore and outwardly accessible at another portion to a button sub-assembly. The button sub-assembly includes a spring on one side of the bore, and an actuator portion on the other side of the bore exposed at the accessible portion of the head. The actuator portion is movable with respect to the head after the button sub-assembly is inserted into the socket. The spring includes a detent adapted to cooperate with one of the at least one retainer notches provided along the post when the post is moving longitudinally.

The head restraint pad may be moved with respect to the motor vehicle seat by moving the actuator portion which in turn moves the detent out of alignment with the associated retainer notch.

It is an object of the present invention to provide an improved head restraint assembly that enables a head restraint pad to be moved with respect to a motor vehicle seat.

Another object of the present invention is to provide a head restraint assembly which is removable from the vehicle seat.

A further object of the present invention is to provide a head restraint assembly which does not require additional tooling to remove the head restraint pad posts.

Another object of the present invention is to provide a head restraint assembly which is easy to manufacture and has a simplistic design.

DETAILED DESCRIPTION OF THE PREFERRED EMBODIMENTS

Figure 1:
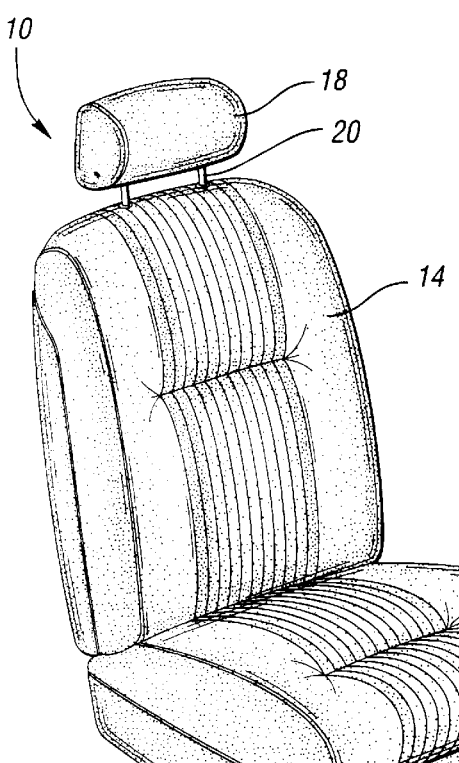
FIG. 1 is a perspective view of a motor vehicle seat of the type having a separate adjustable head restraint assembly.

Referring now to FIG. 1, there is shown a perspective view of a motor vehicle seat 10 having a bottom cushion 12 and a seat back 14. Head restraint assembly 16 is carried by the seat back 14 and has a pad 18 and a pair of downwardly extending mounting posts 20.

FIGS. 2 through 5 illustrate the head restraint assembly 16 in the preferred embodiment. The head restraint assembly 16 is provided to enable the pad 18 to be moved with respect to the motor vehicle seat 10, and includes at least one tubular bushing 22, preferably made of plastic, mounted to the seat back 14. Preferably, one tubular bushing 22 is provided for each post 20. Each tubular bushing 22 has an inside bore 24 larger than the diameter of the post 20 for receiving the post 20. The bushing 22 further includes a head 26 formed at the upper end thereof which engages the outside of the seat back 14 when mounted to the seat 10. Preferably the seat back 14 includes a frame member 28 having an opening 30 larger than the tubular bushing 22 for receiving the tubular bushing 22.

Figure 2:
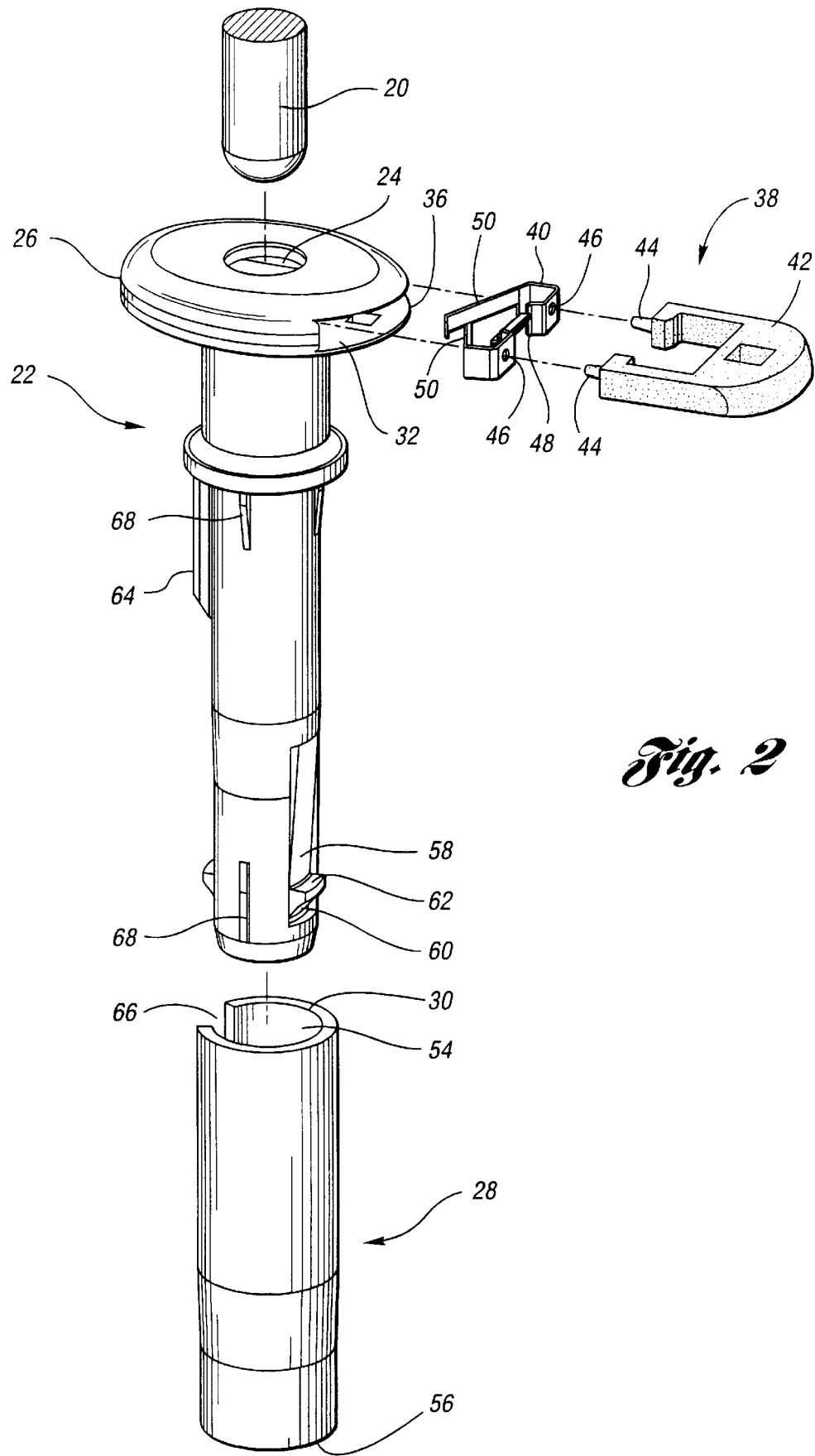
FIG. 2 is an exploded view of the head restraint assembly according to the present invention.

As illustrated in FIG. 2, the head 26 has a socket 32 exposed to the bore 24 at a first end 34, and outwardly accessible at a second end 36. A button sub-assembly 38 is insertable into socket 32 through the accessible second end 36 and includes a spring 40 located on one side of the bore 24, and an actuator portion 42 located on the other side of the bore 24 and exposed at the accessible end 36 of the head 26. In the preferred embodiment, the actuator portion 42 is provided with at least one protrusion 44 insertable into at least one aperture 46 formed on the spring 40, thereby removably connecting spring 40 and actuator 42 together. Additionally, the button sub-assembly 38 is configured to conform to the head 26 at the accessible second end 36 in the illustrated arrangement so that a flush engagement results when the actuator portion 42 is moved with respect to the head 26.

Further, in the preferred arrangement, the spring 40 is provided with a saddle portion 48 and legs 50. Upon insertion of the button sub-assembly 38, the spring 40 is positioned on one side of the bore 24 with legs 50 contacting the first end 34 of the socket 32, and actuator 42 positioned on the opposite side of bore 24 exposed at the accessible second end 36 of socket 32.

Figure 3:
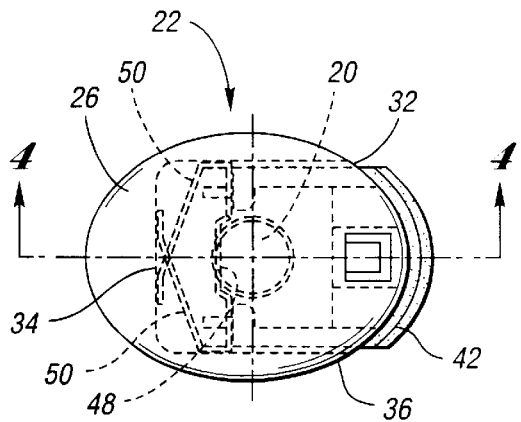
FIG. 3 is a top plan view of the head restraint assembly.
Figure 4:
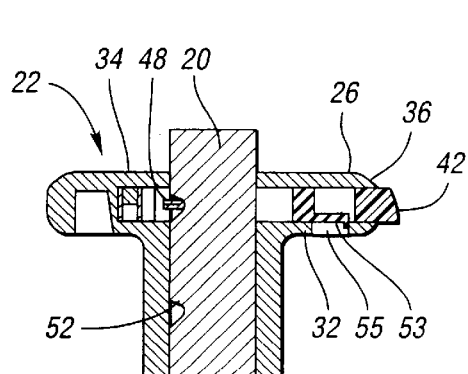
FIG. 4 is a cross-sectional view of the head restraint assembly taken along line 4—4 of FIG. 3.

The operation of button sub-assembly 38 may be understood upon reference to FIGS. 3 and 4. The post 20 is formed with at least one retainer notch 52 on its outer surface. When more than one retainer notch 52 is provided, they are preferably aligned on one side of post 20. The saddle portion 48 is biased into alignment with the associated notch 52 provided along post 20 when post 20 is moving longitudinally.

The head restraint pad 18 may be moved with respect to the seat 10 by moving actuator 42 radially into the socket 32 with the push of a finger, in turn compressing the legs 50 of the spring 40 and moving saddle portion 48 out of alignment with the associated notch 52. The pad 18 can then be moved longitudinally within the bore 24 until the desired height is reached. Actuator 42 is released and saddle portion 48 is again in alignment with a different notch 52.

IN the preferred arrangement, it is desirable to retain the button sub-assembly 38 within the socket 32 while permitting the actuator 42 to be moved radially with respect to the head 26. This is accomplished by providing a retaining tab 53 formed on the actuator 42 and a longitudinal slot 55 formed on the head 26 at the accessible second end 36. The tab 53 is movable within the slot 55 thereby limiting the transverse movement of actuator 42 so that button sub-assembly 38 is not unintentionally removed from the socket 32. Alternatively, the tab 54 may be formed on the head 26 and the slot 52 may be formed on the actuator 42, accomplishing the same result.

Figure 5:
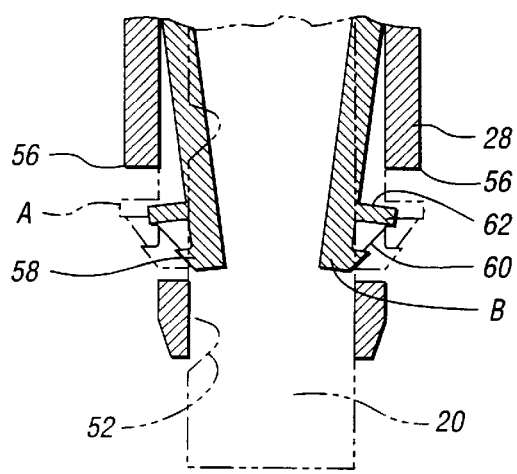
FIG. 5 is an enlarged cross-sectional view of part of FIG. 4, showing movement of the latch member between a latched and unlatched position.

In order to secure the bushing 22 into the seat back 12, the frame 28 is provided with a bore 54 extending from opening 30 and terminating at a length shorter than the length of the tubular bushing 22 to define a keeper 56. The tubular bushing 22 further defines a latch member 58 movable between a latched position A and an unlatched position B as shown in FIG. 5. The latch 58 includes a ramp surface 60 and a radial shoulder 62. Upon assembly, when the bushing 22 is inserted into the frame bore 54, the ramp surface 60 engages the frame bore 54 until radial shoulder 62 abuts the keeper 56. Next, the post 20 is inserted into the bore 24 thereby locking the latch 58 into latched position A and thereby anchoring bushing 22 into seat frame 28.

In use, the bushing 22 may be removed from the seat frame 28 by first removing the post 20 from the bore 24 causing the latch 58 to collapse into the unlatched position B as shown in FIG. 5. This allows the bushing 22 to be removed from the seat frame 28 if so desired.

In order to assure that bushing 22 is inserted into frame bore 54 in the same orientation upon repeated insertion, an orientation locator projection 64 is formed on the tubular bushing 22. The locator projection 64 is insertable into a slot portion 66 provided on the frame bore 54. Additionally, in order to assure that the bushing 22 is snugly fit into the frame bore 54, at least one rib 68 may be provided on tubular bushing 22 for localized frictional engagement with the seat frame bore.

Thus, it is apparent that there has been provided, in accordance with the invention, an improved head restraint assembly for motor vehicle seats that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

What is claimed is:

1. An improved head restraint assembly for enabling a head restraint pad to be moved with respect to a vehicle seat back, comprising:

at least one post connected to and supporting the head rest restraint pad for longitudinal movement in two directions, at least one of the at least one post forming at least one retainer notch on the outer surface of the at least one post, at least one tubular bushing for mounting in a seat back and having an inside bore for receiving the at least one post, the at least one tubular bushing having a head adapted to remain outside the seat back, the head having a socket exposed at one portion to the bore and being outwardly accessible, a button sub-assembly adapted for accommodation in the socket through the accessible portion of the head, the button sub-assembly including a spring located on one side of the bore, and an actuator portion located on the other side of the bore and exposed at the accessible portion of the head, the actuator portion having a connector surface and being moveable with respect to the head after the button sub-assembly is inserted into the socket, the spring having an engaging portion that cooperates with the connector surface of the actuator portion for removably detaching the actuator portion from the spring and the spring also including a saddle portion adapted to cooperate with at least one retainer notch provided along the post and arrest longitudinal movement thereof upon engagement, the saddle portion being movable out of alignment with an associated retainer notch when the actuator portion is moved so that the head restraint pad may be moved with respect to the seat back, and at least one latch member on the tubular bushing movable between a latched position and being biased towards the unlatched position, the latch member being moved into the latched position when the post is received into the bore and serving to anchor the bushing within the seat back when in the latched position, and biased into the unlatched position when the post is removed from the bore, thereby allowing the tubular bushing to be removed from a frame of the seat back.

2. The improved head restraint assembly of claim 1, further comprising at least one rib formed on the tubular bushing for localized frictional engagement with a frame of the seat back.

3. The improved head restraint assembly of claim 1, further comprising a retaining tab on the actuator portion and a longitudinal slot formed on the head at the accessible portion, the tab being biased in a lock position and being smaller than the slot and movable within the slot for retaining the button sub-assembly within the socket, while permitting the actuator portion to move radially with respect to the head and wherein the tab is movable to an unlock position for removing the button sub-assembly from the head.

4. The improved head restraint assembly of claim 1, wherein the button sub-assembly is configured to conform to the head at the accessible portion so that a flush engagement results when the actuator portion is moved with respect to the head.

5. The improved head restraint assembly of claim 1, wherein the tubular bushing includes a locator projection insertable within a slot portion of a frame of the seat back such that when the tubular bushing is received into the frame, the tubular bushing is received in the same orientation upon repeated insertion.

6. The improved head restraint assembly of claim 1, wherein the tubular bushing is made of plastic.

7. The improved head restraint assembly of claim 1, wherein said assembly is adapted for use on a frame of the seat back which includes a bore shorter than the tubular bushing, the bore having an opening at one end thereof and a keeper at the other end thereof, such that the keeper recieves the latch member when the latch member is moved to the latched position upon insertion of the at least one post, thereby latching the tubular bushing in the bore when the bushing is mounted to the seat frame.

8. The improved head restraint assembly of claim 1, wherein the latch member is formed on the tubular bushing.

9. The improved head restraint assembly of claim 1, wherein the connector surface further comprises at least one protrusion extending from the actuator portion and the engaging portion further comprises at least one aperture for removably receiving the at least one protrusion, thereby permitting removable detachment of the sub-assembly from the head portion.

* * * * *

UNITED STATES PATENT AND TRADEMARK OFFICE
CERTIFICATE OF CORRECTION

PATENT NO : 6,099,077
DATED : August 8, 2000
INVENTOR(S) : TROY ALLEN ISAACSON

It is certified that error appears in the above-identified patent and that said Letters Patent are hereby corrected as shown below:

Column 5, Line 14, Claim 7: delete "recieves" and insert --receives--.

Signed and Sealed this

Seventeenth Day of April, 2001

Attest:

NICHOLAS P. GODICI

Attesting Officer    Acting Director of the United States Patent and Trademark Office